United States Patent
Ihle

(10) Patent No.: US 10,969,264 B2
(45) Date of Patent: Apr. 6, 2021

(54) CAPACITIVE LEVEL SENSOR AND METHOD OF MEASURING THE LEVEL OF A MEDIUM

(71) Applicant: SICK AG, Waldkirch (DE)

(72) Inventor: Marc Ihle, Freiburg (DE)

(73) Assignee: SICK AG, Waldkirch (DE)

( * ) Notice: Subject to any disclaimer, the term of this patent is extended or adjusted under 35 U.S.C. 154(b) by 207 days.

(21) Appl. No.: 16/107,125

(22) Filed: Aug. 21, 2018

(65) Prior Publication Data

US 2019/0086253 A1    Mar. 21, 2019

(30) Foreign Application Priority Data

Sep. 15, 2017 (EP) .................................... 17191220

(51) Int. Cl.
*G01F 23/26* (2006.01)
*G01F 23/00* (2006.01)

(52) U.S. Cl.
CPC ........ *G01F 23/266* (2013.01); *G01F 23/0061* (2013.01); *G01F 23/265* (2013.01); *G01F 23/268* (2013.01)

(58) Field of Classification Search
CPC .... G01F 23/266; G01F 23/26; G01F 23/0076; G01F 23/263; G01F 23/268
See application file for complete search history.

(56) References Cited

U.S. PATENT DOCUMENTS

| 6,490,920 | B1 | 12/2002 | Netzer |
| 6,539,797 | B2 | 4/2003 | Livingston et al. |
| 2003/0000303 | A1* | 1/2003 | Livingston ............ G01F 23/266 73/304 C |
| 2008/0092647 | A1* | 4/2008 | Kumazawa ........... G01F 23/268 73/304 C |

FOREIGN PATENT DOCUMENTS

| DE | 3026342 A1 | 2/1982 |
| EP | 2489996 A1 | 8/2012 |
| EP | 2657663 A1 | 10/2013 |

OTHER PUBLICATIONS

European Search Report dated Mar. 5, 2018 in corresponding European Patent Application No. EP17191220.7.

* cited by examiner

*Primary Examiner* — Walter L Lindsay, Jr.
*Assistant Examiner* — Andrew V Do
(74) *Attorney, Agent, or Firm* — Nath, Goldberg & Meyer; Jerald L. Meyer

(57) ABSTRACT

A capacitive level sensor (10) for measuring the level of a medium (14) in a container (12) is provided having a probe (16) for immersion into the medium (14) that has at least one measurement electrode (26) for a capacitance measurement and having a measurement and evaluation unit (20) that is configured to determine a capacitance at the measurement electrode (26) and to calculate a level from it. In this respect, the probe (16) has at least one reference electrode (28) for a capacitance measurement independent of the level to thus compensate environmental influences on the capacitance measurement at the measurement electrode (26).

16 Claims, 2 Drawing Sheets

CAPACITIVE LEVEL SENSOR AND METHOD OF MEASURING THE LEVEL OF A MEDIUM

FIELD

The invention relates to a capacitive level sensor for the capacitive measurement of the level of a medium in a container having a probe for immersion into the medium that has at least one measurement electrode for a capacitance measurement and having a measurement and evaluation unit that is configured to determine a capacitance at the measurement electrode and to calculate a level from it. The invention further relates to a method for the capacitive measurement of the level of a medium in a container in which the capacitance is measured at a measurement electrode of a probe dipping into the medium; and in which a level is calculated from it.

BACKGROUND

A known principle for determining levels in a container is based on a capacitance measurement. A probe is introduced into the container for this purpose and the capacitance between the probe and a reference is measured. This capacitance is changed in dependence on the level due to the dielectric properties of the medium. The level is calculated from the measured capacitance while taking account of the dielectric constant of the medium. A metallic container, an introduced metal surface, additional electrodes on the probe or a second probe serve as the counter-electrode, typically at ground potential.

The measured capacitance, however, does not only depend on the level, but also on parasitic components, in particular on the carrier to which the electrodes are attached. The environmental conditions that influence the parasitic components are highly variable in part as in the example of a hot liquid running into a tank fast where the probe heats rapidly at the bottom and initially remains cool at the top. A further dynamic influence arises due to the so-called permeation, namely the diffusion of moisture into the probe and thereby different degrees of moisture of the probe. The measurement of the capacitance and consequently of the level is highly falsified by such effects.

A capacitive level sensor is known from EP 2 657 663 A1 whose probe has a plurality of consecutive segments having measurement electrodes in a longitudinal direction. Provision is made for the calibration to measure base capacitance values of the segments when they are not immersed in the medium. The calibration and level measurement can consequently only take place at different times so that the reaction to dynamic changes of the environment has to remain sluggish and imprecise. An embodiment of EP 657 663 A1 additionally provides a temperature sensor with which the temperature is measured to correct the capacitance values by means of a stored characteristic. This requires a teaching effort for the determination of the characteristic and in addition local temperature differences along the probe remain out of consideration.

U.S. Pat. No. 6,539,797 B2 describes a capacitive level sensor that has at least one lower electrode for a reference measurement within the medium, an upper electrode for a reference measurement outside the medium, and a middle, actual measurement electrode for determining the capacitance in dependence on the level of the medium. However, which influences changing the capacitance act on the middle, actual measurement electrode can actually not be determined by such reference electrodes.

SUMMARY

Against this background, it is the object of the invention to improve the measurement with a capacitive level sensor.

This object is satisfied by a capacitive level sensor and by a method for the capacitive measurement of the level of a medium in accordance with the respective independent claim. The level sensor has a probe that dips into the medium and that has at least one measurement electrode for a capacitance measurement from which is level is calculated. The capacitance is measured here between a measurement electrode and a reference such as a container wall or between a plurality of measurement electrodes of the probe.

The invention starts from the basic idea of measuring a capacitance independently of the level to compensate environmental influences on the probe. For the capacitance at the measurement electrode not only changes with the level, but also with the susceptibility or with the dielectric constant of the probe itself, for example of a carrier to which the measurement electrodes are attached. Examples of important influence values are here the temperature and the moisture of the probe arising through permeation. The probe now has, in addition to the measurement electrode, at least one reference electrode that is arranged such that its measurement result is not dependent on the level. The electric field between the reference electrode and its reference, for example a screen of the probe or a further reference electrode, therefore does not penetrate the medium or at most penetrates it in a negligible manner due to the position of the reference electrode and/or of screens. Only the portion of the capacitance changes independent of the level is measured via a capacitance measurement of the reference electrode to thus compensate the actual capacitance measurement at the measurement electrode.

The invention has the advantage that a falsification of the measurement results through environmental influences such as temperature and humidity is compensated and an exact detection of the level thus becomes possible independently of fluctuations in temperature, humidity, and material. A teaching phase or a restriction to narrow limit values for temperature, humidity, or material is no longer necessary.

The measurement and evaluation unit is preferably configured to deduct changes of the capacitance due to environmental influences measured via the reference electrode in the capacitance measurement at the measurement electrode. The capacitance changes measured via the reference electrode are actually the portion of the variability that is caused by secondary influences such as temperature and humidity. The measurement electrode determines a capacitance that results through a superposition of such secondary influences and the looked for changes of the level. A more exact measurement result is therefore obtained overall by subtraction.

The measurement electrode and the reference electrode are preferably interconnected to one another such that a capacitance measurement already determines a capacitance compensated by environmental influences. For example, the signal of the reference electrode is directly deducted from that of the measurement electrode so that only the level-dependent measurement signal remains, without any disrupting environmental influences. The compensation here therefore takes place directly during the measurement and not, as in other embodiments, by an evaluation of the two capacitance measurements at the measurement electrode and the reference electrode, with a combination of a direct compensation in the electrode circuit and in the evaluation also being conceivable. For a compensating interconnection of the measurement electrode and the reference electrode, their geometries should preferably be coordinated with one another.

The reference electrode is preferably arranged in the interior of the probe. This is a particularly suitable position in which it is ensured that the reference electrode actually measures the influences to which the measurement electrode is also exposed, but the field at the reference electrode at the same time is not influenced by the medium. The matching reference is thus measured exactly independently of the level. The probe can have a screen layer between the outer measurement electrode and the inner reference electrode. Such an inward screen layer anyway has advantages for the measurement and it additionally supports the measurement by means of the reference electrode being independent of the level.

The probe preferably has a carrier to which the measurement electrode and the reference electrode are attached, in particular a measurement electrode on a front side and a reference electrode on a rear side of the carrier. This produces a simple probe which is easy to manufacture and in which the medium only influences the capacitance measurement at the measurement electrode. A screen layer of the carrier can be provided between the measurement electrode and the reference electrode.

The carrier preferably has less material between measurement electrodes. Carrier material is removed for this purpose in that it is thinned out or in that openings are applied. The carrier material between measurement electrodes acts as a dielectric that is exposed to the environmental influences. The fluctuations due to environmental influences are therefore minimized by less carrier material in the intermediate region. Less compensation is then necessary via the reference electrode. It is conceivable to omit the carrier and instead to coat metallic parts as passivation.

The carrier preferably has openings for an improved climate balance in the interior of the probe. This is particularly advantageous when the reference electrode is arranged in the interior. Without a fast climate balance, delays could otherwise occur; in the meantime, the reference electrode is exposed to a different humidity and temperature than the measurement electrode. The openings therefore provide better reference measurement data via the improved climate balance. This is above all useful in highly dynamic procedures, for instance on a temperature shock or on the fast filling of a hot, steaming liquid.

The carrier preferably has a flexible circuit board that is shaped to a desired shape of the probe and is in particular rolled in tube shape. Electrode structures can be arranged very simply and inexpensively in practically any desired design on a flexible circuit board. An inexpensive probe with electrodes is thus produced. The reference electrode is preferably located on the rear side so that it is disposed inwardly in the probe after the rolling up.

The probe preferably has a tube of nonconductive material, in particular a plastic tube. The tube serves as an envelope so that the electrodes are not directly exposed to the medium. In addition, the probe is mechanically stabilized, particularly in the shape of a flexible circuit board. The tube can, however, also itself serve as a carrier for the electrodes attached thereto. The tube is preferably closed and sealed at the bottom so that the medium cannot penetrate and so that the measurement remains independent of the level.

The probe preferably has a ventilation passage extending over its longitudinal extent in its inner space. The permeation is admittedly even desired to a certain extent so that a reference electrode in the interior of the probe is at least approximately exposed to the same humidity and temperature as the measurement electrode. The humidity can, however, produce a harmful gas atmosphere in the probe. As compensation, sufficient ventilation is provided by construction measures such as the ventilation passage similar to a chimney.

The probe preferably has a plurality of consecutive segments in a longitudinal direction that each have at least one measurement electrode and at least one reference electrode. Such a segmented probe delivers considerably more measurement values for a more exact level determination. A plurality of measurement electrodes between which the capacitance is determined are preferably arranged in each segment. An outer reference for only one single measurement electrode per segment, such as a metallic container wall, is, however, not precluded. It is advantageous to provide a reference electrode in each segment so that a capacitance comparable to the respective measurement electrode of the segment is determined as the reference.

The reference electrode preferably has an elongated shape in the longitudinal direction of the probe. The reference electrode is correspondingly narrow in the peripheral direction of the probe and is thus still very small and easy to handle overall, for example in the form of a rectangle, which substantially covers the probe or a segment of the probe in the longitudinal direction. The geometry of the reference electrode preferably corresponds to a measurement electrode or is optimized thereto.

The reference electrode preferably has a meandering structure or a comb structure. A very great length is thus achieved with a small area. This reference electrode detects information on the effects of environmental influences in a larger region that preferably at least approximately corresponds to the region that also influences the measurement electrode. With a meandering reference electrode, good reference values for a plurality of measurement electrodes can in particular be determined between which a capacitance for a level measurement is measured.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
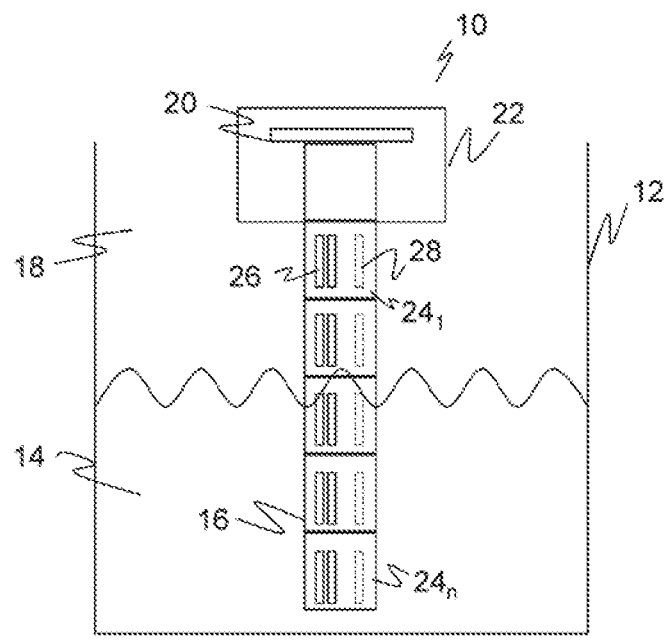
FIG. 1 a schematic sectional view of a level sensor placed into a container.

FIG. 1 shows schematically in a side view a capacitive level sensor 10 that is attached in a tank or container 12 having a medium 14. A container 12 is to be understood very generally as the boundary region surrounding the medium 14; for example, the water level in a lake can also be measured by the level sensor 10. A probe 16 projects into the medium 14, preferably down to the base of the container 12, to determine the level of the medium 14. In principle, it is also possible to install the probe 16 into the container 12 from below, with the evaluations then having to be correspondingly reversed.

The capacitive properties of the probe 16 change in dependence on the level due to the different dielectric properties of the medium 14 with respect to the medium located above it, typically air 18. It can be measured via capacitance measurements by a measurement and evaluation unit 20 in a sensor head 22 of the level sensor 10. The level sensor 10 is thus in a position to output a measurement value for the filling level of the medium 14 in the container 14 and also, with a known container geometry, for the volume of medium 14 present. The medium 14 can, for example, be any desired liquid such as coolants and lubricants, hydraulic oils, cleaning agents, laboratory chemicals, or wet chemistry in production lines, but also bulk material or granulate.

The probe 16 is divided into a plurality of segments $24_1$-$24_n$ in its longitudinal extent, that is in a vertical direction in FIG. 1. In another embodiment, the probe 16 is not segmented, which means the same as that it has only one segment $24_1$. Each segment $24_1$-$24_n$ has at least one measurement electrode 26; in the example shown a pair of measurement electrodes 26. Depending on the embodiment, a capacitance is measured by the measurement and evaluation unit 20 between the measurement electrodes 26, between groups of measurement electrodes 26, or between at least one measurement electrode 26 and an outer reference such as a further probe, not shown, or the wall of the container 12.

A capacitance measurement takes place, for example, in that an alternating voltage is applied to the respective measurement electrode 26 or measurement electrodes 26, in particular an on-off pattern in a pulse-like manner to trigger capacitive charging and discharging procedures. The capacitance is determined via a measurement of the electrical current flowing in this process. Such a capacitance measurement is known per se. Integrated circuits or chips are, for example, available from the field of touch screen control that carry out capacitance measurements with a number of passages for selectable electrodes or electrode pairs.

The capacitance to be measured is dependent on the level of the medium 14, on the one hand. Its susceptibility or dielectric constant should be known here or at least have been previously measured. There are also measurement processes that determine the level and the dielectric constant together or that implicitly consider the dependence on the latter.

On the other hand, there is also, however, a dependence for the capacitance to be measured on properties of the probe 16 and of the environment, in particular on material properties of a carrier of the probe 16 at which the measurement electrodes 26 are arranged and on the temperature and humidity. The susceptibility of the probe thereby changes and the measurement result of the level is falsified.

Reference electrodes 28 are provided in addition to the measurement electrodes 26 on the probe 16 for this reason. A preferred example with one reference electrode 28 per segment is shown. It is alternatively conceivable to transfer reference measurements of one segment to other segments if the errors that thereby occur are accepted and thus to manage with fewer reference electrodes 28. Conversely, instead of one reference electrode 28 per segment, a pair of reference electrodes 28 or an even more complex arrangement can also be used.

The reference electrodes 28 are located in the interior of the probe 16 and are therefore shown by dashed lines. A capacitance measurement by means of the reference electrodes 28 is therefore independent of the level of the medium 14. The reference electrodes 28, however, react in the same way as the measurement electrodes 26 to changes of the capacitive properties of the probe 16 itself, including changes to the temperature and to the humidity. The temperature dependence and humidity dependence of the capacitance measurement at the measurement electrodes 26 can therefore be compensated using the capacitance measured via the reference electrodes 28. This can take place in the measurement and evaluation unit 20 in that changes of the capacitance of the reference measurement are deducted from the actual measurement that is thus only influenced by the sought level. Alternatively or additionally, it is also conceivable to interconnect the measurement electrodes 26 and reference electrodes 28 such that the influences of temperature and humidity are directly compensated, that is a capacitance only dependent on the level is measured.

Figure 2:
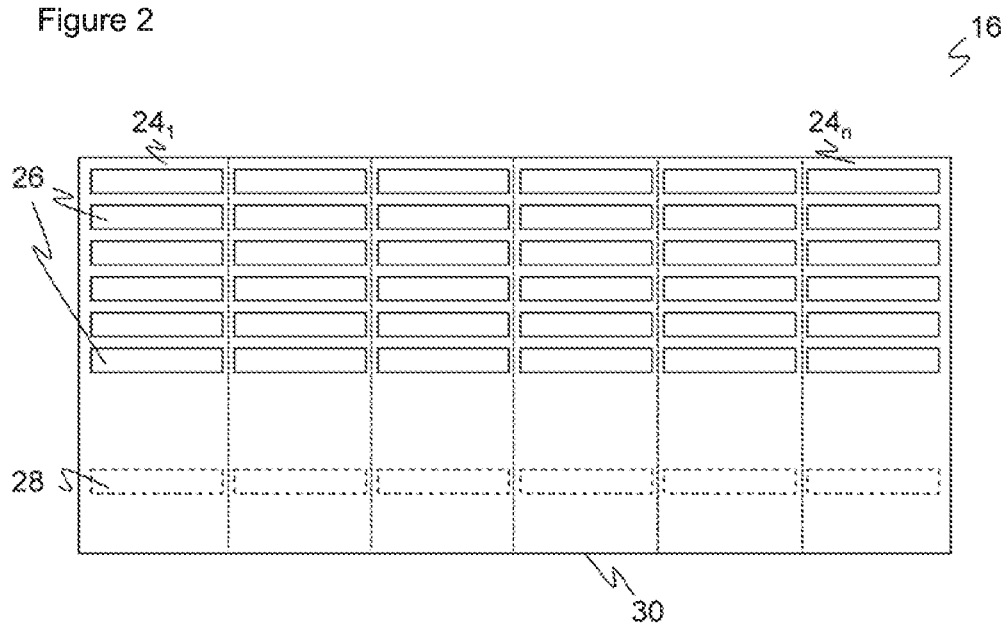
FIG. 2 a plan view of an electrode structure of a probe for a level sensor.

FIG. 2 shows a plan view of an embodiment of an electrode structure of the probe 16. The electrodes 26, 28 in this embodiment are applied to a flexible circuit board 30 that is subsequently rolled to form the probe 16. In addition, the rolled circuit board 30 is then preferably surrounded by a protective and stabilizing tube of non-conductive material that is here designated in simple form as a plastic tube, and is sealed at the bottom so that the medium 14 does not penetrate. In another embodiment, the electrodes 26, 28 are attached to a different carrier than the circuit board 30 and for this case FIG. 2 can be considered a cut-away view of the carrier.

The representation of the probe 16 in FIG. 2 is rotated by 90° with respect to FIG. 1. The longitudinal extent of the probe 16 that is vertically dipped into a container 12 in the typical application as in FIG. 1 is thus horizontal in FIG. 2. The segments $24_1$-$24_n$ can again be recognized in this longitudinal extent. The measurement electrodes 25 each extend completely over a segment $24_1$-$24_n$, with a certain spacing being ensured with respect to the next segment $24_1$-$24_n$ for an electric decoupling.

The measurement electrodes 26 are disposed next to one another in a transverse direction perpendicular to the longitudinal direction, that is to the peripheral direction of the probe 16. The rectangular shape of the measurement electrodes 26 shown is here admittedly preferred due to the simple geometry, but is not absolutely necessary. The number and mutual spacings of the measurement electrodes 26 are also exemplary.

The flexible circuit board 30 comprises, in accordance with typical manufacturing methods, a plurality of layers of different materials. They have different susceptibilities with respect to one another in dependence on the humidity and on the temperature. In this respect, the different layers absorb humidity changes and temperature changes at different speeds. The maximum moisture absorption of the layers is also different.

The capacitance measured at the measurement electrodes 26 not only depends on the level of the medium 14, but also on this variable susceptibility of the flexible circuit board 30. To compensate this, the reference electrodes 28 already introduced with respect to FIG. 1 are provided that are again drawn dashed because they are disposed on the rear side of the flexible circuit board 30.

The flexible circuit board 30 is preferably rolled twice so that the region of the measurement electrodes 26 represents the periphery of the probe 16 and the reference electrodes 28 are located on the rear side of the measurement electrodes 26 after the rolling together. Screen elements, not shown in FIG. 2, can also be provided on the flexible circuit board 30 that form a screen layer between the measurement electrodes 26 and the reference electrodes 28 after the rolling up. Alternatively, the structure on the flexible circuit board 30 can also have a different design so that the reference electrodes 28 are already located on the rear side of the flexible circuit board 30 opposite the measurement electrodes 26.

Due to the arrangement of the reference electrodes 28 in the interior of the probe 16, in particular when a screen layer is present between the measurement electrodes 26 and the reference electrodes 28, the capacitance measured via the reference electrodes 28 only depends on the susceptibility of the flexible circuit board 30. By an offsetting of the measured capacitance values via the measurement electrodes 26 and the reference electrodes 28, a corrected capacitance value is determined that is determined independently of the susceptibility of the flexible circuit board 30 only by the level of the medium 14.

Figure 3:
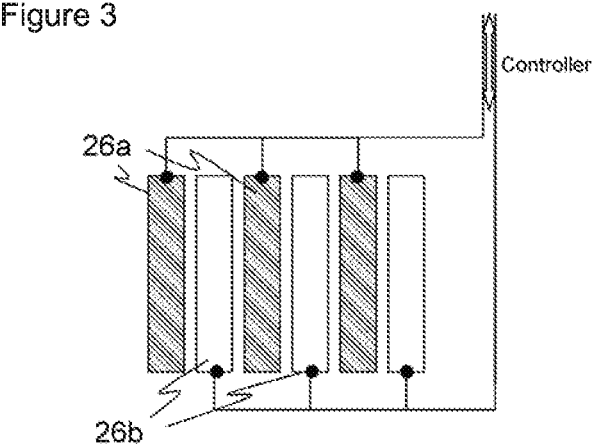
FIG. 3 a representation of an exemplary interconnection of electrodes in a segment of a probe.

FIG. 3 shows the measurement electrodes 26 of a single segment 24₁-24ₙ in a part section. Capacitance values are respectively measured between two measurement electrodes 26 or groups of measurement electrodes 26. For this purpose, as in this example, three respective measurement electrodes 26a-b are alternately connected to a common electrode, as shown in FIG. 3 by different hatching and connections to the measurement and evaluation unit 20. This is, however, to be understood purely by way of example. It is equally conceivable that a plurality of measurements take place between respective adjacent measurement electrodes 26 or one or more capacitance measurements take place between any desired other combinations of measurement electrodes 26 of a segment 24₁-24ₙ. The measurement of a capacitance between individual measurement electrodes 26 or groups of electrodes with reference to an outer reference such as a wall of the container 12 is conceivable in principle even though the reference to the probe 16 itself is more robust and more exact.

Figure 4:
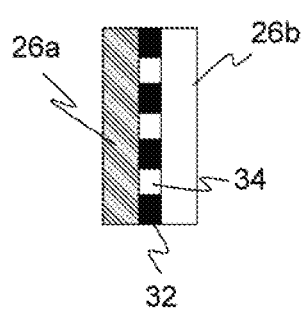
FIG. 4 a representation of a measurement electrode pair for explaining a minimization of carrier material to falsify the capacitance measurement as little as possible.

FIG. 4 schematically shows a pair of measurement electrodes 26a-b. The capacitance therebetween is determined the most by the susceptibility of the material located in the intermediate space. This influence can be considerably reduced when the material in the intermediate space is thinned out. For this purpose, openings 32, for instance holes or one or more elongate slits, can be applied in the flexible circuit board 30 or generally to the carrier between the measurement electrodes 26a-b. Webs 34 or interruptions of the openings 32 with material of the flexible circuit board 30 or of the carrier should remain for the mechanical stability.

Openings 32 in the flexible circuit board 30 or in the carrier can have yet a further function, namely a harmonizing of the humidity at both sides of the flexible circuit board 30. Measurement electrodes 26 and reference electrodes 28 are thereby exposed to a comparable humidity and the reference measurement becomes more exact and is not subject to any unwanted delay. The openings 32 can serve a double function for this harmonization function or openings are applied in a supplementary or alternative manner to another point.

It appears contradictory at first glance to also support the unwanted permeation artificially. Now, however, on the one hand, the moisture that reaches the outer side of the flexible circuit board 30 has anyway already penetrated through the protective outer plastic pipe by permeation so that it is too late to protect the probe 16 from it. In addition, a chimney-like ventilation passage preferably remains in the interior of the probe via which the moisture escapes upwardly and ultimately to the outside. The moisture must, however, first move into the interior of the probe 16 for this purpose.

Figure 5:
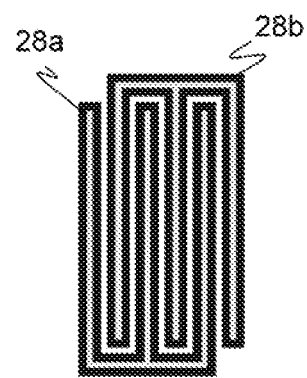
FIG. 5 a representation of reference electrodes with a comb structure or meandering structure.

FIG. 5 schematically shows a pair of reference electrodes 28a-b having a comb structure or meandering structure. In this embodiment, the capacitance measurement therefore takes place for the compensation between two reference electrodes 28a-b. A measurement via only one reference electrode 28 toward another reference is equally conceivable with an analog geometry. Due to the meandering structure over a large area, the influence of the different layers of the flexible circuit board 30 on the reference electrode 28 becomes more similar to that on the measurement electrodes 26 since the capacitance values are measured over practically the same regions of the flexible circuit board 30 with a suitable geometrical design of the meandering structure. A corresponding optimization of the meandering structure is possible by a selection of the number, arrangement, lengths, and widths of the mutually engaging tongues.

The invention claimed is:

1. A capacitive level sensor for measuring the level of a medium in a container, the capacitive level sensor comprising:
   a probe for immersion into the medium that has at least one measurement electrode for a capacitance measurement; and
   a measurement and evaluation unit that is configured to determine a capacitance at the measurement electrode and to calculate a level from it,
   wherein the probe has at least one reference electrode for a capacitance measurement independent of the level to thus compensate environmental influences on the capacitance measurement at the measurement electrode,
   and wherein the probe has a plurality of consecutive segments in a longitudinal direction that each have at least one measurement electrode and at least one reference electrode.

2. The capacitive level sensor in accordance with claim 1, wherein the measurement and evaluation unit is configured to deduct changes of the capacitance measured via the reference electrode due to environmental influences on the capacitance measurement at the measurement electrode.

3. The capacitive level sensor in accordance with claim 1, wherein the measurement electrode and the reference electrode are interconnected to one another such that a capacitance measured at the measurement electrode determines a capacitance compensated by environmental influences.

4. The capacitive level sensor in accordance with claim 1, wherein the reference electrode is arranged in the interior of the probe.

5. The capacitive level sensor in accordance with claim 1, wherein the probe has a carrier to which the measurement electrode and the reference electrode are attached.

6. The capacitive level sensor in accordance with claim 5, wherein the measurement electrode is attached on a front side of the carrier and the reference electrode is attached on a rear side of the carrier.

7. The capacitive level sensor in accordance with claim 5, wherein the carrier has material thinned out in an intermediate space between the measurement and reference electrodes.

8. The capacitive level sensor in accordance with claim 5, wherein the carrier has openings for an improved climate balance in the interior of the probe.

9. The capacitive level sensor in accordance with claim 5, wherein the carrier has a flexible circuit board capable of being shaped into a desired shape of the probe.

10. The capacitive level sensor in accordance with claim 9, wherein the carrier has a flexible circuit board that is rolled in tube shape.

11. The capacitive level sensor in accordance with claim 1, wherein the probe has a tube of non-conductive material.

12. The capacitive level sensor in accordance with claim 1, wherein the probe has a ventilation passage extending over its longitudinal extent in its inner space.

13. The capacitive level sensor in accordance with claim 1, wherein the reference electrode has an elongated shape in the longitudinal direction of the probe.

14. The capacitive level sensor in accordance with claim 1, wherein the reference electrode has a meandering structure.

15. A method for the capacitive measurement of the level of a medium in a container using the capacitive level sensor of claim 1, in which the capacitance is measured at a measurement electrode of a probe dipping into the medium; and in which a level is calculated from it, wherein a capacitance is measured at a reference electrode of the probe that is independent of the level due to the positioning on the reference electrode; and wherein environmental influences on the capacitance measurement at the measurement electrode are thus compensated.

16. A capacitive level sensor for measuring the level of a medium in a container, the capacitive level sensor comprising:

a probe for immersion into the medium that has at least one measurement electrode for a capacitance measurement; and a measurement and evaluation unit that is configured to determine a capacitance at the measurement electrode and to calculate a level from it, wherein the probe has at least one reference electrode for a capacitance measurement independent of the level to thus compensate environmental influences on the capacitance measurement at the measurement electrode, wherein the probe has a carrier to which the measurement electrode and the reference electrode are attached, and wherein the measurement electrode is attached on a front side of the carrier and the reference electrode is attached on a rear side of the carrier.

* * * * *